United States Patent
Kamiya et al.

(10) Patent No.: US 7,288,907 B2
(45) Date of Patent: Oct. 30, 2007

(54) HALF-OPEN POSITION HOLDING APPARATUS FOR VEHICLE OPENING AND CLOSING MEMBER

(75) Inventors: Haruo Kamiya, Atsugi (JP); Osamu Kawanobe, Isehara (JP)

(73) Assignee: Mitsui Mining and Smelting Co. (JP)

( * ) Notice: Subject to any disclaimer, the term of this patent is extended or adjusted under 35 U.S.C. 154(b) by 40 days.

(21) Appl. No.: 11/400,859

(22) Filed: Apr. 10, 2006

(65) Prior Publication Data

US 2006/0232100 A1   Oct. 19, 2006

(30) Foreign Application Priority Data

Apr. 13, 2005   (JP)   ............... P2005-116068

(51) Int. Cl.
*E05F 11/00* (2006.01)
*B60J 5/00* (2006.01)

(52) U.S. Cl. ............... 318/266; 318/446; 49/280; 49/360; 296/146.2; 296/155

(58) Field of Classification Search .......... 318/55, 318/446, 266, 280; 49/280, 360; 16/52; 296/155, 146.2

See application file for complete search history.

(56) References Cited

U.S. PATENT DOCUMENTS

| | | | | |
|---|---|---|---|---|
| 5,525,875 | A * | 6/1996 | Nakamura et al. | 318/266 |
| 6,134,837 | A * | 10/2000 | Kawanobe et al. | 49/360 |
| 6,398,288 | B1 * | 6/2002 | Yuge | 296/146.4 |
| 6,729,071 | B1 * | 5/2004 | Kawanobe et al. | 49/360 |
| 6,955,389 | B2 * | 10/2005 | Suzuki et al. | 296/146.4 |
| 7,003,915 | B2 * | 2/2006 | Yokomori | |
| 7,178,854 | B2 * | 2/2007 | Ichinose et al. | |
| 7,210,731 | B2 * | 5/2007 | Ichinose et al. | |
| 2001/0033086 | A1 * | 10/2001 | Yuge | |
| 2004/0256883 | A1 * | 12/2004 | Ichinose et al. | |
| 2004/0262945 | A1 * | 12/2004 | Suzuki et al. | |
| 2005/0001444 | A1 * | 1/2005 | Sakai et al. | |
| 2005/0001568 | A1 * | 1/2005 | Yokomori | |

(Continued)

FOREIGN PATENT DOCUMENTS

JP   3-37172   4/1991

*Primary Examiner*—Paul Ip
(74) *Attorney, Agent, or Firm*—Kilpatrick Stockton LLP

(57) ABSTRACT

A half-open position holding apparatus for a vehicle opening and closing member includes an opening and closing member supported in a vehicle body to be openable and closable and has an opening and closing member driving unit that has a motor and a electromagnetic clutch that can put a power transmission path connecting the motor and the opening and closing member in a connected state and in a disconnected state, for driving the opening and closing member in opening and closing directions thereof, and an in-vehicle battery serving as a power source for the electromagnetic clutch. The apparatus includes a controller for controlling the opening and closing member driving unit, that, when the opening and closing member is held at a half-open position between a fully-closed position and a fully-opened position, holds the opening and closing member at the half-open position by stopping the motor, putting the electromagnetic clutch in a connected state, and controlling the electromagnetic clutch to a half-open position holding connection state such that a voltage applied to the electromagnetic clutch becomes a predetermined voltage lower than an output voltage of the in-vehicle battery.

8 Claims, 3 Drawing Sheets

U.S. PATENT DOCUMENTS

2005/0039405 A1* 2/2005 Yokomori
2006/0137136 A1* 6/2006 Imai et al.
2006/0168891 A1* 8/2006 Aoyama et al.
2006/0175865 A1* 8/2006 Ichinose et al.
2006/0175868 A1* 8/2006 Ichinose et al.

* cited by examiner

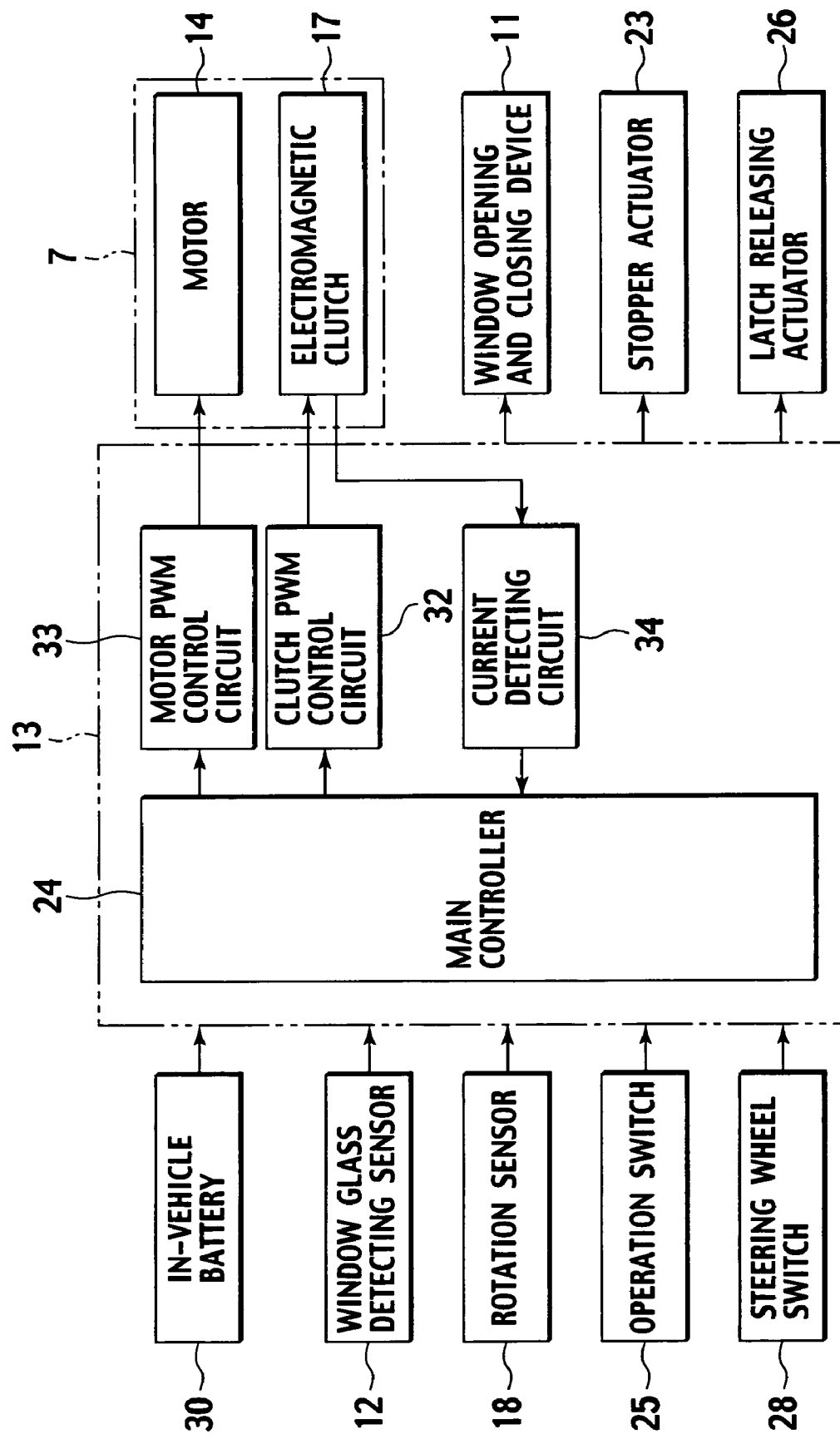

HALF-OPEN POSITION HOLDING APPARATUS FOR VEHICLE OPENING AND CLOSING MEMBER

BACKGROUND OF THE INVENTION

1. Field of the Invention

The present invention relates to a half-open position holding apparatus for a vehicle opening and closing member that can hold an opening and closing member at a half-open position between a fully-closed position and a fully-opened position.

2. Description of the Related Art

In a related half-open position holding apparatus for an opening and closing member for a vehicle, for example, a sliding door, for preventing a sliding door from moving downwardly along an inclination direction due to a self-weight of the door when the sliding door is stopped at a half-open position between a fully-closed position and a fully-opened position, for example, during a vehicle being parked on an inclined road, a motor is stopped and an electromagnetic clutch is controlled to a connected state such that a rotational resistance of the motor serves as a braking force (Japanese Utility Model Application No. H03-37172).

SUMMARY OF THE INVENTION

However, in a half-open position holding apparatus for a vehicle sliding door described in Japanese Utility Model Application No. H03-37172, for preventing a sliding door from moving downwardly along an inclination direction due to a self-weight of the door even after an ignition switch of a vehicle is turned off and an engine is stopped, it is necessary to continue to supply current to an electromagnetic clutch. Therefore, there is a problem that, when current supply to the electromagnetic clutch is conducted for a long time, power consumption of an in-vehicle battery increases, and this problem results in reduction of a life thereof.

The present invention has been achieved in order to solve the problem of the related technique, and an object thereof is to provide a half-open position holding apparatus for a vehicle opening and closing member that reduces power consumption of an in-vehicle battery when an opening and closing member is held at a half-open position.

In order to achieve this object, according to one aspect of the invention, there is provided a half-open position holding apparatus for a vehicle opening and closing member comprising: an opening and closing member that is supported in a vehicle body in an openable and closable manner; an opening and closing member driving unit that has a motor and an electromagnetic clutch that can connect and disconnect a power transmission path connecting the motor and the opening and closing member, for driving the opening and closing member in opening and closing directions; an in-vehicle battery serving as a power source for the electromagnetic clutch; and a controller that controls the opening and closing member driving unit and that, when the opening and closing member is held at a half-open position, holds the opening and closing member at the half-open position between a fully-closed position and a fully-opened position by stopping the motor, putting the electromagnetic clutch in a connected state, and controlling the electromagnetic clutch to a half-open position holding connection state such that a voltage applied to the electromagnetic clutch is put in a predetermined voltage lower than an output voltage of the in-vehicle battery.

According to this aspect of the invention, the voltage applied to the electromagnetic clutch can be suppressed to the predetermined voltage lower than an output voltage of the in-vehicle battery. That is, since the opening and closing member can be held at a half-open position by the minimum holding force that allows holding of the opening and closing member in the half-open position, power consumption in the in-vehicle battery can be reduced.

The controller can control the electromagnetic clutch to the half-open position holding connection state according to PWM (pulse width modulation) control.

According to the configuration, the voltage applied to the electromagnetic clutch can be controlled to a predetermined voltage according to PWM control. Thereby, the temperature rise of the electromagnetic clutch can be suppressed as much as possible, and performance degradation thereof can be suppressed.

The controller can calculate a duty ratio of the PWM control such that the voltage applied to the electromagnetic clutch becomes the predetermined voltage based on the output voltage of the in-vehicle battery.

According to the configuration, the controller can perform control such that the voltage applied to the electromagnetic clutch always becomes the predetermined voltage based on the output voltage of the in-vehicle battery.

The controller can calculate a duty ratio of the PWM control such that the voltage applied to the electromagnetic clutch becomes the predetermined voltage based on current flowing into the electromagnetic clutch.

According to the configuration, the controller can perform control such that the voltage applied to the electromagnetic clutch always becomes the predetermined voltage based on current flowing into the electromagnetic clutch.

The controller can control driving of the opening and closing member driving unit in the closing direction of the opening and closing member such that the opening and closing member is moved toward the fully-closed position when the output voltage of the in-vehicle battery lowers to another predetermined voltage during control of the electromagnetic clutch to the half-open position holding connection state.

According to the configuration, for example, a trouble such that the output voltage of the in-vehicle battery lowers to a voltage which cannot control the electromagnetic clutch to the connected state and the opening and closing member moves downwardly in the inclination direction due to a self-weight thereof during the vehicle being parked on an inclined road can be prevented.

The controller can control driving of the opening and closing member driving unit in the closing direction of the opening and closing member such that the opening and closing member is moved from the half-open position toward the fully-closed position after a predetermined time period elapsed from a time when the electromagnetic clutch has been controlled to the half-open position holding connection state.

According to the configuration, omission of closing the opening and closing member can be reliably prevented, and current is prevented from being supplied to the electromagnetic clutch for a long time, so that excessive discharging of the in-vehicle battery can be prevented.

The controller can control driving of the opening and closing member driving unit in the closing direction or the opening direction of the opening and closing member such that the opening and closing member is moved in the fully-closed position or the fully-opened position by detecting that the opening and closing member has been moved from the half-open position in the closing direction or in the opening direction during control of the electromagnetic clutch to the half-open position holding connection state.

According to the configuration, for example, when a vehicle is stopped on a parking road whose surface is a steep slope exceeding an allowable range where the opening and closing member can be held at the half-open position, even if the electromagnetic clutch connected to the half-open position holding connection state starts to slip due to a movement of the opening and closing member from the half-open position in an inclined direction, the opening and closing member can be safely moved in the closing direction and the opening direction by the opening and closing member driving unit.

The controller can conduct control so as to apply 100% of the output voltage of the in-vehicle battery to the electromagnetic clutch when an ignition switch in the vehicle body is in an ON state, and conduct the half-open position holding connection control when the ignition switch is turned OFF.

According to the configuration, the controller can conduct the half-open position holding connection control only when the ignition switch is in an OFF state.

BRIEF DESCRIPTION OF THE DRAWINGS

FIG. 3 is a block diagram of a control circuit according to a second embodiment of the present invention.

DESCRIPTION OF THE PREFERRED EMBODIMENT

Figure 1:
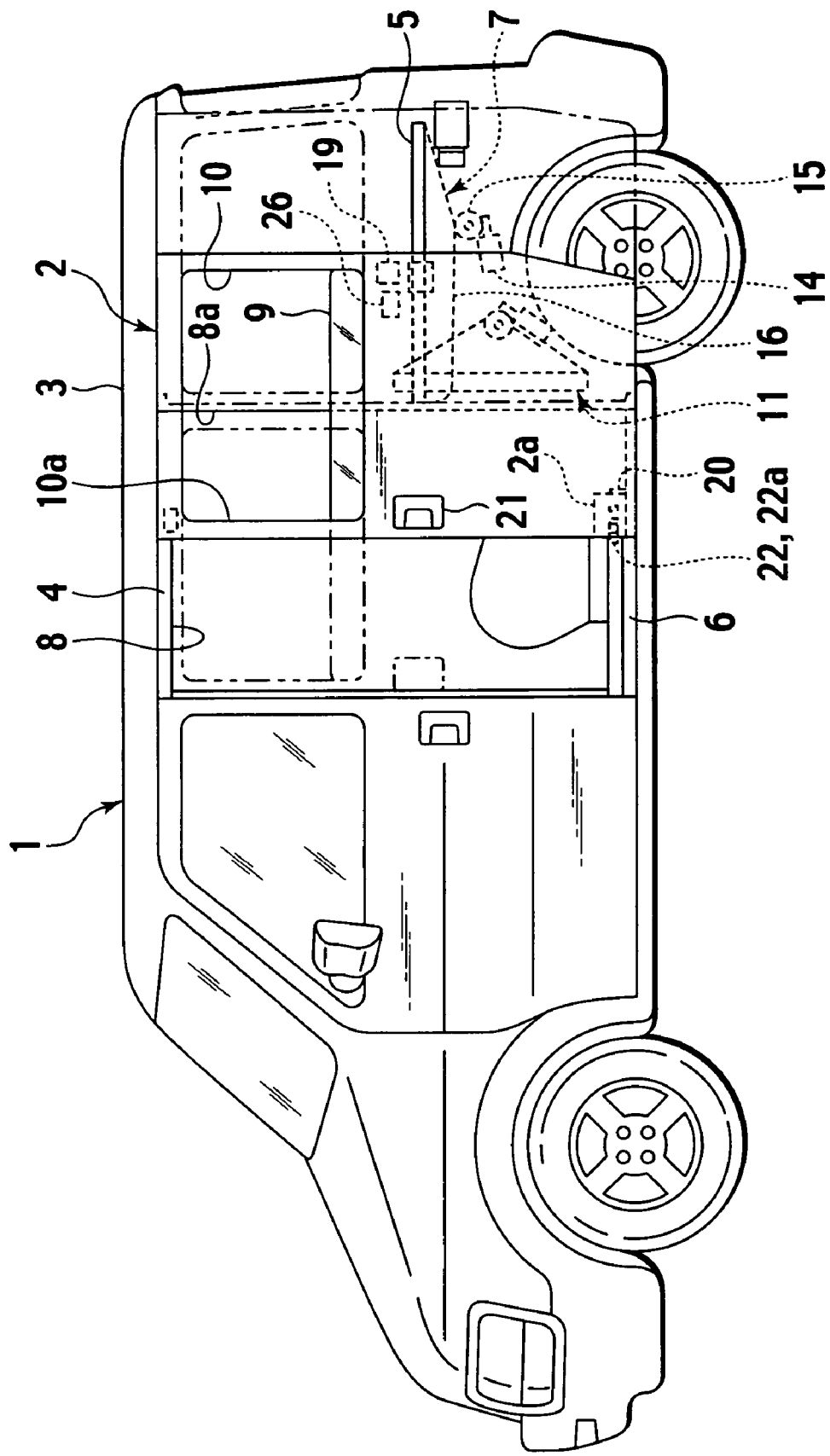
FIG. 1 is a side view of a vehicle according to a first embodiment of the present invention.

First and second embodiments of the present invention will be explained below with reference to the accompanying drawings. Note that like or similar parts in the drawings are designated with like or similar reference numerals, and the drawings are shown as schematic diagrams.

Furthermore, the first and the second embodiments explained below illustrate an apparatus and a method that embody technical ideas of the invention, and the technical ideas of the invention are not intended to specify materials, shapes, configurations, arrangements and the like of constituent elements to described ones below. The technical ideas of the invention can be variously modified within the scope of the appended claims.

First Embodiment

The first embodiment of the invention will be explained below with reference to the drawings. FIG. 1 is a side view of a vehicle according to the first embodiment of the invention. In the following explanation, a leftward direction in FIG. 1 denotes "front", while a rightward direction in FIG. 1 denotes "rear".

A sliding door 2 constitutes an opening and closing member of a vehicle 1 of a mini-van or a wagon type, and it is supported to be openable and closable in front and rear directions by guide rails 4, 5, and 6 fixed to an upper portion, a middle portion, and a lower portion of a vehicle body 3 to extend in a horizontal direction. The sliding door 2 can be moved from a fully-closed position where a door entrance 8 provided in an outside face of the vehicle body 3 has been closed to a fully-opened position where the sliding door 2 has been moved rearward along the side face of the vehicle body 3, while the sliding door 2 is being moved slightly from a side face of the vehicle body 3 to the outside and vise versa by a manual operation or an electric-powered operation performed by a driving force of a door opening and closing driving device 7 described later and serving as an opening and closing member driving unit.

A window glass 9 movable in a vertical direction for opening and closing is provided in a window opening portion 10 provide in an approximately upper half of the sliding door 2. The window glass 9 is ascended and descended by an electric-powered window opening and closing device 11 accommodated in the sliding door 2, so that the window opening portion 10 is opened by descending of the window glass 9 and it is closed by ascending thereof.

A window glass detecting sensor 12 (see FIG. 2) that can detect opened and closed states of the window glass 9 is provided to a window opening and closing device 11 or a sash (not shown) for the window opening portion 10 for guiding the window glass 9 in a vertical direction.

The widow glass detecting sensor 12 detects an opened state of the window glass 9 to outputs an opening signal when the window glass 9 is descended from a fully-closed position in a predetermined amount (for example, 150 mm) or more, and it detects the fully-closed position of the window glass 9 and a state that a descending amount of the window glass 9 is less than the predetermined amount as a state that the window glass 9 is in a closed state to output a closing signal. A range of the opened state of the window glass 9 can be properly set depending on shapes, sizes of the sliding door 2, the window glass 9 and the like.

Respective signals from the window glass detecting sensor 12 are inputted into a control device 13 (see FIG. 2) serving as a controller and disposed on a proper portion of the vehicle body 3, the door opening and closing driving device 7 is controlled as described below by a control device 13.

A fully-closed position latch device 19 is provided at a rear end portion within the sliding door 2. The fully-closed position latch device 19 holds the sliding door 2 at the fully-closed position by engagement thereof with a striker (not shown) fixed to a proper portion of an opening rear edge 8a in the door entrance 8.

A fully-opened position latch device 20 and an intermediate stopper unit 22 are provided at a lower roller 2a provided at a lower end front portion of the sliding door 2. The fully-opened position latch device 20 holds the sliding door 2 at the fully-opened position by engagement thereof with a striker (not shown) provided at a rear end portion of the lower guide rail 6.

The fully-closed position latch device 19 and the fully-opened position latch device 20 are actuated for releasing according to operation of an outboard operation handle 21 provided on the sliding door 2 and operation of an inboard operation handle (not shown) provided on the sliding door 2, and a latch releasing actuator 26 coupled to the fully-closed position latch device 19 and the fully-opened position latch device 20 to be released from the respective strikers so that an opening operation and a closing operation for the sliding door 2 can be made possible.

The intermediate stopper unit 22 functions to restrict a moving amount of the sliding door 2 in the opening direction at the half-open position between the fully-closed position and the fully-opened position when the window glass 9 is put in the opened state.

When the sliding door 2 is stopped at the half-open state, an opening front edge 10a of the window opening portion 10 is positioned forward of an opening rear edge 8a of the door entrance 8, so that, even if the window glass 9 is in the open state, a material is prevented from being caught between the opening front edge 10*a* of the window opening portion 10 and the opening rear edge 8*a* of the door entrance 8.

The intermediate stopper unit 22 has a stopper lever 22*a*. When the window glass 9 is in the fully-closed state, the intermediate stopper unit 22 is actuated to a retreated state where the stopper lever 22*a* has been retreated from the lower guide rail 6 to allow a movement of the sliding door 2 to the fully-opened position, and when the window glass 9 is in the fully-opened state, the intermediate stopper unit 22 is actuated to a stopper state where the stopper lever 22*a* has projected into the guide rail 6 to restrict movements of the sliding door 2 in the opening direction at the half-open position by abutting of the stopper lever 22*a* on a stopper portion (not shown) provided on the guide rail 6.

As means for actuating the intermediate stopper unit 22 to the retreated state and the stopper state, for example, a stopper actuator 23 (see FIG. 2) including a motor or a solenoid is used. Instead, when a mechanical detecting lever that detects an opened state or a closed state of the window glass 9 is provided instead and the detecting lever and the stopper lever 22*a* of the intermediate stopper unit 22 are coupled to each other, the intermediate stopper unit 22 can be actuated to the retreated state and the stopper state in synchronization with an action of the detecting lever.

The stopper actuator 23 is coupled to the stopper lever 22*a* of the intermediate stopper unit 22 and it is controlled by the control device 13 based on respective signals outputted from the window glass detecting sensor 12, as described later.

The door opening and closing driving device 7 is housed in the vehicle body 3, and it includes a reversible motor 14, a rotary drum 15 that can be rotated via a reduction gear (not shown) that reduces rotation speed of the motor 14, a cable 16 that is wound on the rotary drum 15 to be capable of be taken up and fed out, and is disposed along the intermediate guide rail 5 to be coupled to a rear end central portion of the sliding door 2, and an electromagnetic clutch 17 (see FIG. 2) that is provided in a power transmission path connecting the motor 14 and the sliding door 2 and can put the power transmission path in a connected state and a disconnected state. When an operation switch 25 (see FIG. 2) provided on a wireless remote control switch or the like near a driver seat is operated by a driver, the power transmission path is put in the connected state by the electromagnetic clutch 17 and the sliding door 2 can be electrically driven in the opening direction or in the closing direction according to a forward rotation or a reverse rotation of the motor 14.

The rotary drum 15 is rotated via the cable 16 corresponding to a moving direction, a moving velocity, and a moving amount of the sliding door 2. A rotational shaft of the rotary drum 15 includes a rotation sensor 18 (see FIG. 2) that detects a rotation angle of the rotary drum 15 with high resolution.

The rotation sensor 18 includes a rotary encoder (not shown) that generates pulse signals corresponding to an rotation angle and a rotation direction of the rotary drum 15 that always rotates in synchronization with opening and closing movements of the sliding door 2, and it feeds pulse signals serving as a detection signal and corresponding to rotation of the rotary drum 15 to the control device 13.

When the electromagnetic clutch 17 puts the power transmission path in a disconnected state, the sliding door 2 can be freely opened and closed according to manual operation. When the electromagnetic clutch 17 is put in a connected state and the motor 14 is stopped, a braking path extending from the sliding door 2 side to the motor 14 through the rotary drum 15, the electromagnetic clutch 17, and the reduction gear mechanism is formed and the sliding door 2 can be held at the half-open position by a braking force acting on the braking path.

When the sliding door 2 is moved in the opening direction (or in the closing direction) by operation of the operation handle 21, the operation to the operation handle 21 is detected by a handle switch 28 (see FIG. 2) provided on the operation handle 21 so that the power transmission path is put in a connected state by the electromagnetic clutch 17 and the motor 14 is rotated forwardly (or reversely). Thereby, the opening and closing movements of the sliding door 2 is switched from the manual operation to the electric-powered operation.

Figure 2:
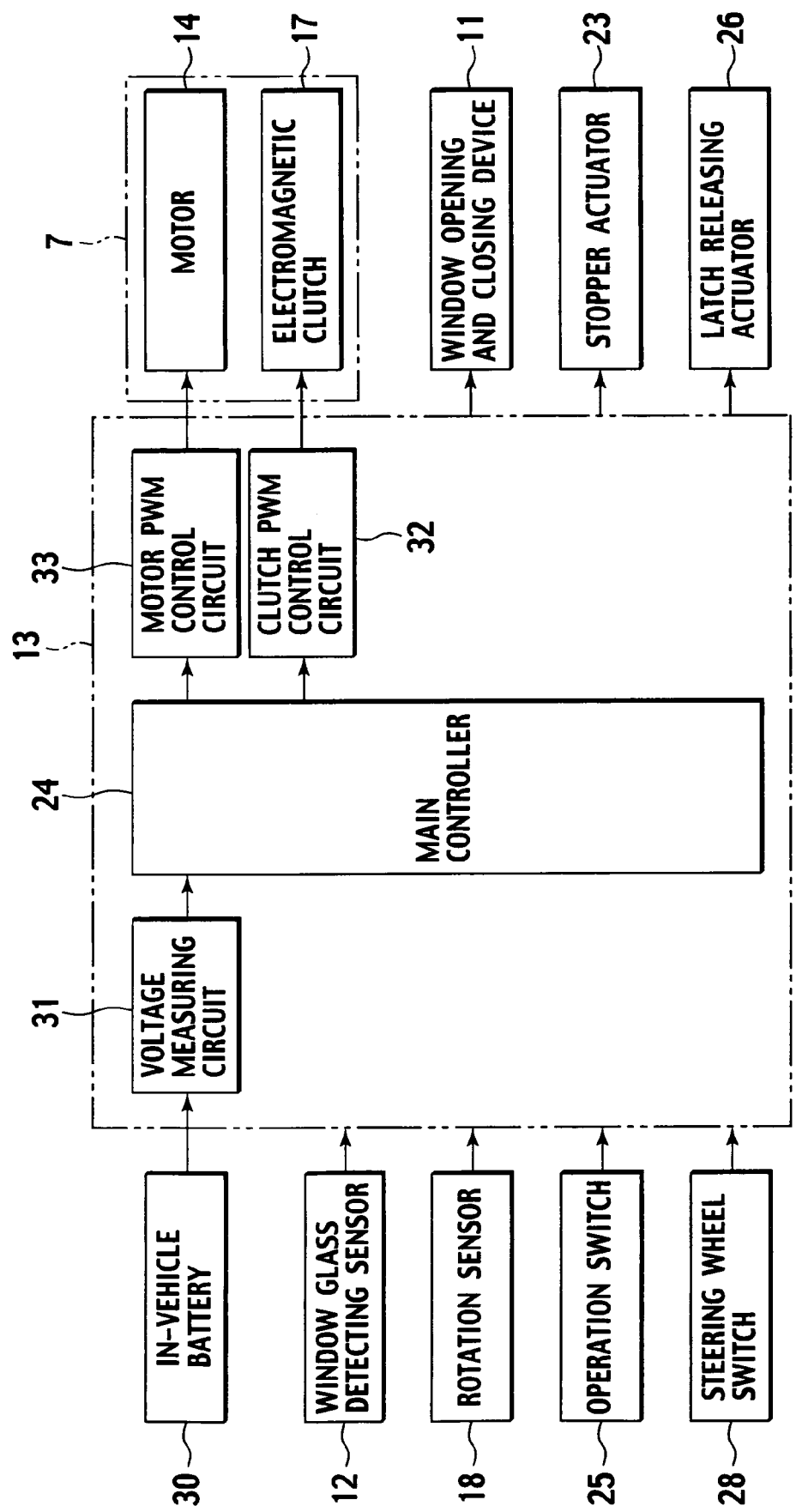
FIG. 2 is a block diagram of a control circuit according to the first embodiment.

FIG. 2 shows a block diagram of a control circuit. The control device 13 has a main control unit 24 including a microcomputer, a voltage measuring circuit 31 that measures an output voltage from the in-vehicle battery 30 with a rated voltage of DC 12 V mounted in the vehicle 1, a clutch PWM control circuit 32 that controls the electromagnetic clutch 17 according to PWM control, and a motor PWM control circuit 33 that control the motor 14 according to PWM control, and input ports thereof are connected with the window glass detecting sensor 12, the rotation sensor 18, the operation switch 25, the in-vehicle battery 30, and the like.

The window opening and closing device 11, the window glass detecting sensor 12, the latch releasing actuator 26 and the like provided on the sliding door 2 side are always electrically connected to the in-vehicle battery 30 and the control device 13 on the vehicle body 3 side via electric cables (not shown) disposed between the sliding door 2 and the vehicle body 3 flexibly.

A main control unit 24 in the control device 13 includes a door moving direction detecting circuit, a counter, a door position detecting circuit, a door moving distance measuring circuit, an overload detecting circuit, and a door velocity measuring circuit.

The door moving direction detecting circuit detects a rotation direction of the rotary drum 15, namely, a moving direction of the sliding door 2 based on a two-phase pulse signal outputted from the rotation sensor 18.

The counter counts the number of pulse signals generated from the rotation sensor 18 in a range from the fully-closed position of the sliding door 2 to the fully-opened position.

The door position detecting circuit detects the position of the sliding door 2 based on the counted value of the counter.

The door moving distance measuring circuit measures a moving distance of the sliding door 2 based on the counted value of the counter.

The overload detecting circuit detects an overload state when a pulse width of a pulse signal outputted from the rotation sensor 18 is a threshold or more.

The door velocity measuring circuit measures a moving velocity of the sliding door 2 based on a pulse width of a pulse signal outputted from the rotation sensor 18.

A voltage applied to the motor 14 and the electromagnetic clutch 17, namely, a rotational speed of the motor 14 and a connecting force of the electromagnetic clutch 17 are controlled by changing a duty ratio of the PWM control.

When the sliding door 2 is held at the half-open state, the main control unit 24 calculates a duty ratio such that the voltage applied to the electromagnetic clutch 17 becomes a predetermined voltage (for example, 7 V) on the output voltage of the in-vehicle battery 30 detected by the voltage measuring circuit 31 for controlling the electromagnetic clutch 17 in the connected state and it outputs a pulse width modulation output signal corresponding to the duty ratio to the clutch PWM control circuit 32. Thereby, the electromagnetic clutch 17 is put in the connected state for the half-open position holding connection state such that the voltage applied to the electromagnetic clutch 17 becomes a predetermined voltage preliminarily set lower than the output voltage of the in-vehicle battery 30.

For example, when the output voltage of the in-vehicle battery 30 measured by the voltage measuring circuit 31 is represented as AV and the predetermined voltage applied to the electromagnetic clutch 17 is represented as BV, the duty ratio of the PWM control when the sliding door 2 is held at the half-open position becomes BV/AV (%). When the sliding door 2 is electrically opened or closed by the door opening and closing driving device 7, the duty ratio of the PWM control is controlled such that 100% of the output voltage of the in-vehicle battery 30 is applied to the electromagnetic clutch 17.

The predetermined voltage applied to the electromagnetic clutch 17 is set to a minimum voltage which allows holding the sliding door 2 at the half-open position when the vehicle is parked on an inclined road having an inclined angle of, for example, about 15°. The minimum voltage can be obtained based on an experimental result such as a performance of the electromagnetic clutch 17 or the weight of the sliding door 2.

The control device 13 performs the following controls in respective states.

When being inputted with an opening operation signal (or a closing operation signal) of the operation switch 25, the control device 13 controls driving of the door opening and closing driving device 7 in the opening direction (or in the closing direction). Specifically, when being inputted with an opening operation signal (or a closing operation signal) of the operation switch 25, the control device 13 controls driving of the latch releasing actuator 26 such that the fully-closed position latch device 19 and the fully-opened position latch device 20 conduct their releasing actions, and controls the electromagnetic clutch 17 in the connected state and controls forward rotation (reverse rotation) of the motor 14. Thereby, the sliding door 2 can be moved in the opening direction (or the closing direction) according to electric-powered operation caused by a driving force of the motor 14.

When being inputted with an opening signal of the window glass detecting sensor 12, the control device 13 performs control such that the intermediate stopper unit 22 is actuated to the stopper state. Specifically, when being inputted with an opening signal of the window glass detecting sensor 12, the control device 13 controls driving of the stopper actuator 23 in a stopper direction such that the intermediate stopper unit 22 is actuated to the stopper state.

When being inputted with a closing signal of the window glass detecting sensor 12, the control device 13 performs control such that the intermediate stopper unit 22 is actuated to the retreated state. Specifically, When being inputted with a closing signal of the window glass detecting sensor 12, the control device 13 controls driving of the stopper actuator 23 in the retreated state such that the intermediate stopper unit 22 is actuated to the retreated state.

When the control device 13 detects an overload state that occurs when the sliding door 2 during an opening action abuts on the intermediate stopper unit 22, it controls the door opening and closing driving device 7 for stop holding. Specifically, when the overload detecting circuit detects an overload that occurs when the sliding door 2 during an opening action abuts on the intermediate stopper unit 22, the control device 13 stops the motor 14 to stop the sliding door 2 at the half-open position. After stopping, the control device 13 controls the electromagnetic clutch 17 to the half-open position holding connection state such that the sliding door 2 does not move downwardly in an inclined direction due to a self-weight thereof. The control to the half-open position holding connection state can be performed regardless of ON (during engine operation) or OFF (during engine stoppage) of the ignition switch of the vehicle 1. Alternately, when the ignition switch is in an ON state, 100% of the output voltage of the in-vehicle battery 30 is applied to the electromagnetic clutch 17, and the control to the half-open position holding connection state can be performed when the ignition switch is turned OFF.

When the control device 13 controls the electromagnetic clutch 17 to the half-open position holding connection state, as described above, the control device 13 calculates the duty ratio of the PWM control such that the output voltage of the in-vehicle battery 30 becomes a predetermined voltage or lower based on the output voltage of the in-vehicle battery 30 detected by the voltage measuring circuit 31 and outputs a pulse width modulation output signal corresponding to the duty ratio to the clutch PWM control circuit 32. Thereby, when the sliding door 2 is held at the half-open position, the control device 13 controls the electromagnetic clutch 17 to the half-open position holding connection state where the predetermined voltage is applied to the electromagnetic clutch 17 according to the PWM control, so that the sliding door 2 can be held at the half-open position, power consumption of the in-vehicle battery 30 can be suppressed as much as possible, and heat generation of the electromagnetic clutch 17 can be suppressed.

After controlling the electromagnetic clutch 17 to the half-open holding position connection state, the control device 13 controls driving of the door opening and closing driving device 17 in the closing direction such that the sliding door 2 held at the half-open position moves to the fully-closed position after a predetermined time t1 elapses. Thereby, omission of closing the sliding door 2 can be reliably prevented, and current is prevented from flowing into the electromagnetic clutch 17 for a long time, so that the in-vehicle battery 30 can be prevented from being discharged excessively.

When the sliding door 2 is held at the half-open position, the control device 13 drives the door opening and closing driving device 7 to forcibly move the sliding door 2 to the closed position when the output voltage of the in-vehicle battery 30 lowers near the predetermined voltage within the predetermined time t1. Thereby, a trouble such that the output voltage of the in-vehicle battery 30 lowers to a voltage at which the electromagnetic clutch 17 cannot be controlled to the connected state and the sliding door 2 moves downwardly in an inclined direction due to its self-weight can be prevented.

When the sliding door 2 moves downwardly from the half-open position in an inclined direction (in the opening direction or in the closing direction) due to the self-weight while the sliding door 2 is being held at the half-open position, the control device 13 performs control so as to move the sliding door 2 to the fully-closed position or the fully-opened position. Specifically, when the door moving distance measuring circuit detects a predetermined distance movement of the sliding door 2 from the half-open position in the inclined direction, the control device 13 adjusts the duty ratio of the PWM control such that the voltage applied to the electromagnetic clutch 7 reaches 100% of the output voltage of the in-vehicle battery 30 and controls driving of the motor 14, thereby controlling driving of the door opening and closing driving device 7 in the closing direction or in the opening direction. Thereby, for example, when a parking road surface is a steep slope exceeding an allowable range where the sliding door 2 can be held at the half-open position owing to the half-open position holding connection state of the electromagnetic clutch 17, even if the electromagnetic clutch controlled to the half-open position holding connection state starts to slip according to start of a movement of the sliding door 2 from the half-open position in the inclined direction, the sliding door 2 can be safely moved in the closing direction or in the opening direction by the door opening and closing driving device 7.

Second Embodiment

FIG. 3 is a block diagram of a control circuit according to a second embodiment of the present invention. A main control unit 24 in the second embodiment calculates a duty ratio such that current flowing into the electromagnetic clutch 17 becomes a predetermined flowing current (current flowing through the electromagnetic clutch 17 when a predetermined voltage is applied to the electromagnetic clutch 17) preliminarily set by the current detecting circuit 34 that measures current flowing through the electromagnetic clutch 17 to output a pulse width modulation output signal corresponding to the duty ratio to the clutch PWM control circuit 32 for putting the electromagnetic clutch 17 in the half-open position holding connection state.

The current flowing through the electromagnetic clutch 17 is proportional to a voltage applied to the electromagnetic clutch 17. Accordingly, by calculating the duty ratio such that the current flowing into the electromagnetic clutch 17 becomes the predetermined flowing current, the voltage applied to the electromagnetic clutch 17 can be set to the predetermined voltage eventually.

In the second embodiment, by adjusting the duty ratio of the PWM control such that the current flowing into the electromagnetic clutch 17 becomes the predetermined flowing current without detecting the output voltage of the in-vehicle battery 30, the voltage applied to the electromagnetic clutch 17 can be set to the predetermined voltage.

Since other configurations in the second embodiment are identical to those in the first embodiment, like elements are designated with like reference numerals, and their explanations will be omitted.

The opening and closing member is not limited to the sliding door shown in the first and the second embodiment, and it can be a side door, a back door, or a trunk lid. For example, the back door is pivoted to the vehicle to be openable and closable in the vertical direction and it is held at a half-open position between a fully-opened position and a fully-closed position.

While the present invention has been explained above by the first and the second embodiments, the invention is not limited thereto. The configuration of each element can be replaced by optional configurations having similar functions.

What is claimed is:

1. A half-open position holding apparatus for a vehicle opening and closing member comprising:
    an opening and closing member supported in a vehicle body to be openable and closable;
    an opening and closing member driving unit having a motor and an electromagnetic clutch that can connect and disconnect a power transmission path connecting the motor and the opening and closing member, for driving the opening and closing member in opening and closing directions;
    an in-vehicle battery serving as a power source for the electromagnetic clutch; and
    a controller controlling the opening and closing member driving unit and, when the opening and closing member is held at a half-open position, holding the opening and closing member at the half-open position between a fully-closed position and a fully-opened position by stopping the motor, putting the electromagnetic clutch in a connected state, and controlling the electromagnetic clutch to a half-open position holding connection state such that a voltage applied to the electromagnetic clutch is put in a predetermined voltage lower than an output voltage of the in-vehicle battery.

2. The half-open position holding apparatus for a vehicle opening and closing member according to claim 1, wherein the controller controls the electromagnetic clutch to the half-open position holding connection state according to PWM control.

3. The half-open position holding apparatus for a vehicle opening and closing member according to claim 2, wherein the controller calculates a duty ratio for PWM control such that the voltage applied to the electromagnetic clutch becomes the predetermined voltage based on an output voltage of the in-vehicle battery.

4. The half-open position holding apparatus for a vehicle opening and closing member according to claim 2, wherein the controller calculates a duty ratio for PWM control such that the voltage applied to the electromagnetic clutch becomes the predetermined voltage based on current flowing into the electromagnetic clutch.

5. The half-open position holding apparatus for a vehicle opening and closing member according to claim 1, wherein the controller controls driving of the opening and closing member driving unit in a closing direction of the opening and closing member such that the opening and closing member is moved toward the fully-closed position, when the output voltage of the in-vehicle battery lowers to another predetermined voltage during controlling the electromagnetic clutch to the half-open position holding connection state.

6. The half-open position holding apparatus for a vehicle opening and closing member according to claim 1, wherein the controller controls driving of the opening and closing member driving unit in a closing direction of the opening and closing member such that the opening and closing member is moved from the half-open position toward the fully-closed position after a predetermined time elapses from a time point when the controller has controlled the electromagnetic clutch to the half-open position holding connection state.

7. The half-open position holding apparatus for a vehicle opening and closing member according to claim 1, wherein the controller controls driving of the opening and closing member driving unit in the closing direction or in the opening direction such that the opening and closing member is moved to the fully-closed position or the fully-opened position by detecting that the opening and closing member has been moved from the half-open position in a closing direction or in an opening direction during controlling the electromagnetic clutch to the half-open position holding connection state.

8. The half-open position holding apparatus for a vehicle opening and closing member according to claim 1, wherein the controller conducts control such that 100% of the output voltage of the in-vehicle battery is applied to the electromagnetic clutch when an ignition switch in the vehicle body is in an ON state, and the controller conducts the half-open position holding connection control at a time when the ignition switch has been turned OFF.

* * * * *